(12) United States Patent
Ohashi et al.

(10) Patent No.: US 9,975,574 B2
(45) Date of Patent: May 22, 2018

(54) DAMPER DEVICE AND STEERING DEVICE

(71) Applicants: JTEKT CORPORATION, Osaka-shi, Osaka (JP); NOK CORPORATION, Tokyo (JP); TOYOTA JIDOSHA KABUSHIKI KAISHA, Toyota-shi, Aichi-ken (JP)

(72) Inventors: Tatsuya Ohashi, Okazaki (JP); Yuki Hanada, Saihaku-gun (JP); Masahide Nitano, Toyota (JP)

(73) Assignees: JTEKT CORPORATION, Osaka-shi (JP); NOK CORPORATION, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/331,735

(22) Filed: Oct. 21, 2016

(65) Prior Publication Data
US 2017/0113719 A1    Apr. 27, 2017

(30) Foreign Application Priority Data
Oct. 22, 2015    (JP) .................................. 2015-208062

(51) Int. Cl.
*B62D 7/22*    (2006.01)
*B62D 7/16*    (2006.01)
(Continued)

(52) U.S. Cl.
CPC .............. *B62D 7/228* (2013.01); *B62D 3/12* (2013.01); *B62D 7/163* (2013.01); *F16F 1/3732* (2013.01);
(Continued)

(58) Field of Classification Search
CPC ....................................................... B62D 7/163
See application file for complete search history.

(56) References Cited

U.S. PATENT DOCUMENTS 7,258,035 B2    8/2007    Bieber
2004/0216548 A1   11/2004    Bieber
(Continued)

FOREIGN PATENT DOCUMENTS

DE    102007000680 A1    5/2009
DE    10 2011 051 715 A1    1/2013
(Continued)

OTHER PUBLICATIONS

Feb. 24, 2017 Search Report issued in European Patent Application No. 16195034.0.
(Continued)

*Primary Examiner* — Terence Boes
(74) *Attorney, Agent, or Firm* — Oliff PLC (57) ABSTRACT

In the damper device, when the large diameter portion does not apply an impact force on the flange portion, the elastic body is disposed in one of the housing and the cylindrical portion with a gap and when the large diameter portion applies the impact force on the flange portion, the elastic body is compressed by the restricting surface and the flange portion in an axial direction to be deformed into a state that the elastic body is brought into contact with all of the housing, the restricting surface, the cylindrical portion and the flange portion to be filled in the gap. The impact receiving member is restricted from a movement relative to the housing by the deformed elastic body when the end portion of the cylindrical portion is advanced into the relief portion and the impact receiving member keeps a non-contact state with the housing.

4 Claims, 6 Drawing Sheets (51) Int. Cl.
*B62D 3/12* (2006.01)
*F16F 1/373* (2006.01)
*F16F 1/44* (2006.01)
*B62D 5/04* (2006.01)

(52) U.S. Cl.
CPC ............ *F16F 1/445* (2013.01); *B62D 5/0421* (2013.01); *B62D 5/0448* (2013.01)

(56) References Cited

U.S. PATENT DOCUMENTS

| | | | |
|---|---|---|---|
| 2005/0167182 A1* | 8/2005 | Abe | B62D 3/12 180/444 |
| 2015/0151787 A1 | 6/2015 | Ohashi | |
| 2016/0052539 A1* | 2/2016 | Ueno | B62D 3/126 74/109 |
| 2017/0113718 A1* | 4/2017 | Ohashi | B62D 3/12 |

FOREIGN PATENT DOCUMENTS

| | | |
|---|---|---|
| EP | 1777138 B1 | 3/2010 |
| EP | 2733048 A2 | 5/2014 |
| EP | 2881304 A1 | 6/2015 |
| GB | 2524604 A | 9/2015 |
| JP | 2009-090788 A | 4/2009 |
| JP | 4255832 B2 | 4/2009 |
| JP | 2012-035713 A | 2/2012 |
| JP | 2015-063157 A | 4/2015 |
| JP | 2015-128981 A | 7/2015 |
| WO | 03029067 A1 | 4/2003 |
| WO | 2005/028284 A1 | 3/2005 |
| WO | 2005/123484 A1 | 12/2005 |

OTHER PUBLICATIONS

Feb. 24, 2017 Search Report issued in European Patent Application No. 16195031.6.

U.S. Appl. No. 15/331,686, filed Oct. 21, 2016 in the name of Ohashi et al.

* cited by examiner

DAMPER DEVICE AND STEERING DEVICE

INCORPORATION BY REFERENCE

This application is based on and claims priority under 35 U.S.C. 119 with respect to Japanese Application No. JP2015-208062 filed on Oct. 22, 2015, the entire content of which is incorporated herein by reference.

BACKGROUND OF THE INVENTION

Field of the Invention

This invention relates to a damper device and a steering device which uses the damper device.

Description of Related Art

A steering device used for a vehicle changes the direction of steered wheels (tires) by reciprocally moving a rack shaft in an axial direction which is connected to the steered wheels through tie-rods. The rack shaft is slidably accommodated in a housing. The rack shaft is structured such that the reciprocal movement range of the rack shaft is physically restricted upon reaching to the limit of a reciprocal movement range by the collision of the large diameter portion formed at the end of the rack shaft with the housing. In more detail, accompanied by the operation of the steering wheel by a driver of the vehicle, the force which moves the rack shaft in an axial direction (forward force) is inputted. Vice versa, for example, when the steered wheel rides onto a curbstone, an excessive force is inputted from the steered wheel towards the rack shaft. Such excessive force moves the rack shaft in an axial direction (reverse force). Accompanied by the input of the forward or reverse force, when the rack shaft is moved in an axial direction until it collides with the housing, a so-called "end abutting" occurs.

In a steering device, a damper device is provided at the end abutting portion to absorb or dampen the impact generated upon end abutting operation. As a damper device, a device has been known which includes a rack shaft with a large diameter portion, a housing through which the rack shaft is movably inserted in an axial direction, the housing restricting the axial movement of the large diameter portion of the rack shaft, and an impact absorbing member which is inserted on a shaft portion of the rack shaft and is disposed between the end surface of the large diameter portion and the housing in an axial direction.

The steering device according to the Patent Literature 1 includes an elastic body (impact absorbing member) disposed between the end member (large diameter portion) and the housing. The impact absorbing member absorbs the collision impact while receiving the impact through the large diameter portion when the large diameter portion collides with the housing. The impact absorbing member includes an end plate (impact receiving member) which receives the collision impact upon contacting with the large diameter portion. The impact receiving member is formed with a restricting portion which contacts with a predetermined portion of the housing. In the Patent Literature 2, an impact absorbing member (damping member) is disclosed, which has an annular plate shaped restricting portion (stopper member) similar to that disclosed in the Patent Literature 1. The damper device according to the Patent Literature 3 includes an impact absorbing member (dampening member) provided at the end portion of the large diameter portion (rack end) facing to the housing. In detail, an annular shaped impact absorbing member is provided on and projecting from the end surface of the large diameter portion. A recessed portion which functions as a "restricting portion" of the Patent Literatures 1 and 2 is provided at the restricting surface of the housing. By the contact between the large diameter portion and the restricting surface of the housing, the compression displacement of the impact absorbing member in an axial direction can be restricted in a predetermined range.

LIST OF RELATED ART

Patent Literature

[PATENT LITERATURE 1]: JP 2015-128981 A
[PATENT LITERATURE 2]: JP2015-63157 A
[PATENT LITERATURE 3]: JP2012-35713 A

DISCLOSURE OF INVENTION

Problems to be Solved by the Invention

However, the damper device according to the Patent Literatures 1 and 2, the structure that the restricting portion is in contact with a predetermined portion of the housing is a prerequisite. The impact absorbing member is displaced in an axial direction when a predetermined force is applied. The restricting portion stops the displacement of the impact absorbing member by the contact with the housing. Thus, the compression displacement of the elastic body of the impact absorbing member is restricted in a certain range and an advantageous effect that a durability of the elastic body is assured can be achieved. Normally, the restricting portion and the housing are formed by a metal material. Thus, when the collision force received by the impact absorbing member is excessively great, the restricting portion and the housing are momentarily brought into contact with each other with a large force and a collision impact of metal to metal is generated. The damper device in the Patent Literature 3, also may generate similar collision impact by the contact of the metal made large diameter portion and the restricting surface of the metal made housing.

For example, in a steering device, each of the components forming the steering device is designed to be durable against a collision impact upon input of the large reverse force generated for example upon riding onto a curbstone by absorbing the impact by the impact absorbing member. However, designing of the components considering a collision impact of larger reverse force which would not be generated practically is not achieved.

The present invention has been made considering the above issues and it is an object of the present invention to provide a damper device and a steering device which can sustain the functions of the device by surely suppressing a force of impact to be transmitted to each component of the device.

Means to Solve the Problems

The damper device according to the invention includes a shaft provided with a shaft portion and a large diameter portion, a housing formed in a cylindrical shape and through which the shaft is inserted for a slidable movement thereof in an axial direction relative to the housing, the housing being provided with a restricting surface facing toward an end surface side of the large diameter portion and an impact absorbing member inserted on the shaft portion and disposed between an end surface of the large diameter portion and the restricting surface in an axial direction. The impact absorbing member of the damper device includes an impact receiving member which is provided with a cylindrical portion facing to an inner peripheral surface of the housing and a flange portion extending from the cylindrical portion outwardly in a radial direction and facing to the restricting surface and being contactable with the large diameter portion and an elastic body provided in a space formed by the inner peripheral surface of the housing, the restricting surface, an outer peripheral surface of the cylindrical portion and the flange portion and formed by a rubber material or a synthetic resin material having a rubber-like elasticity. The housing of the damper device includes a relief portion defined by an area provided continuously inwardly in a radial direction of the restricting surface wherein an end portion of the cylindrical portion can be more advanced towards an opposite side to the large diameter portion than the restricting surface along in an axial direction.

When the large diameter portion does not apply an impact force on the flange portion, the elastic body is disposed having a gap relative to at least one of the inner peripheral surface of the housing and the outer peripheral surface of the cylindrical portion. When the large diameter portion applies the impact force on the flange portion, the elastic body is compressed by the restricting surface and the flange portion in an axial direction. Therefore, the elastic body is deformed to fill up the gap so that the inner peripheral surface of the housing, the restricting surface, the outer peripheral surface of the cylindrical portion and the flange portion are all brought into contact with the elastic body. Then the movement of the impact receiving member relative to the housing is restricted by the deformed elastic body, maintaining a non-contact state of the impact receiving member relative to the housing during an advancing movement of the end portion of the cylindrical portion into the relief portion.

The steering device according to the present invention includes the damper device according to the present invention. The steering device includes the shaft including a rack shaft connected to the steered wheels through tie rods and steers the steered wheels to be steered by reciprocating in an axial direction. The shaft is provided with the large diameter portion to which the tie rod are connected and the housing which accommodates the rack shaft therein.

According to the damper device or the steering device of the present invention, when the large diameter portion applies the impact force to the flange portion, the elastic body starts to be compressively deformed to reduce the gap and then is further compressively deformed to fill up the gap. By the contact of the elastic body with all four surfaces in vertical section, the rigidity of the elastic body is increased and the movement of the impact receiving member relative to the housing can be restricted. The housing is provided with the relief portion, into which the end portion of the cylindrical portion can be more advanced along in an axial direction from the restricting surface towards the opposite side to the large diameter portion. The end portion of the cylindrical portion of the impact receiving member is advanced into the relief portion. The escaping area for enabling the end portion of the cylindrical portion to advance therein when the large diameter portion applies the impact force to the flange portion is ensured by the relief portion to surely avoid the contact between the impact receiving member and the housing. The impact receiving member can surely maintain the non-contact state with the housing and each component of the device can be prevented from transmission of the impact force to improve the reliability of the device.

In this specification, the "elastic body" indicates any member formed by a raw material which expresses "rubber like elasticity" as defined in general and any member within this meaning should not be excluded. As such elastic body, a rubber material or a synthetic resin having a rubber like elasticity can be preferably used.

BRIEF DESCRIPTION OF THE ATTACHED DRAWINGS

Various aspects of this invention will become apparent to those skilled in the art from the following detailed description of the preferred embodiments, when read in light of the accompanying drawings, in which.

DETAILED DESCRIPTION OF THE PREFERRED EMBODIMENTS OF THE INVENTION

Figure 1:
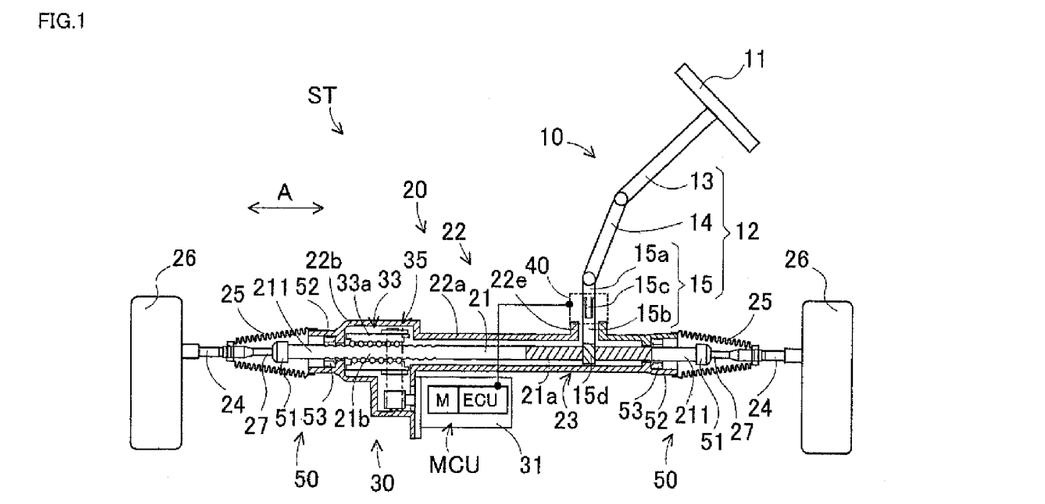
FIG. 1 is a conceptual view of the entire electric power steering device according to an embodiment of the invention.

Hereinafter, a damper device according to the present invention and a steering device according to the present invention in which the damper device of the present invention is used will be explained based on the concrete embodiments of the invention with reference to the attached drawings. In FIG. 1, the steering device ST includes a steering mechanism 10, a turning mechanism 20, a steering assist mechanism 30, a torque detecting device 40 and a damper device 50.

1. Structure of Steering Device

As indicated in FIG. 1, the steering mechanism 10 includes a steering wheel 11 and a steering shaft 12. The steering wheel 11 is fixed to an end portion of the steering shaft 12. The steering shaft 12 transmits a steering torque applied to the steering wheel 11 for turning the steered wheels 26,26 to be steered. The steering shaft 12 is formed by connecting a columnar shaft 13, an intermediate shaft 14 and a pinion shaft 15. The pinion shaft 15 includes an input shaft 15a, an output shaft 15b and a torsion bar 15c. An input side portion of the input shaft 15a is connected to an output side portion of the intermediate shaft 14. A pinion gear 15d is formed at an output side portion of the output shaft 15b.

The turning mechanism 20 includes a rack shaft 21 and a housing 22 formed substantially of a cylindrical shape. The rack shaft 21 is accommodated in the housing and supported thereby for reciprocal movement in a straight line along in an A-axis direction. The housing 22 includes a first housing 22a, and a second housing 22b fixed to the first housing 22a at the left side as viewed in FIG. 1 along in the A-axis direction.

The pinion shaft 15 is rotatably supported in the first housing 22a. The rack shaft 21 is provided with a rack gear 21a and the rack gear 21a and the pinion gear 15d are mutually in mesh with each other to form a rack and pinion mechanism 23. The rack and pinion mechanism 23 is accommodated in the first housing 22a.

The rack shaft 21 includes a pair of large diameter portions 51, 51 at both ends of a shaft portion 211. The pair of large diameter portions 51, 51 is formed by extending the diameter of both ends of the shaft portion 211 of the rack shaft 21. A pair of ball studs 27, 27 is accommodated in the pair of large diameter portions 51, 51 to form a ball joint. A pair of tie rods 24, 24 is connected to each end portion of the ball studs 27, 27 and each tip end of the tie rods 24, 24 is connected to a knuckle (not shown) to which the steered wheels 26, 26 to be steered are assembled. Thus, when the steering wheel 11 is steered, the steering torque is transmitted to the steering shaft 12 and the pinion shaft 15 is rotated. The rotation of the pinion shaft 15 is converted into the straight line reciprocal movement of the rack shaft 21 by the engagement of the pinion gear 15d and the rack gear 21a. This reciprocal movement is transmitted to the knuckles via the tie rods 24, 24. Thus, the steered wheels 26, 26 to be steered are turned to change the running direction of the vehicle. It is noted here that the numeral 25 indicates a boots for keeping the accommodation space of the turning mechanism 20 including the inside of the housing 22 to be in air-tight condition.

A pair of impact absorbing members 53, 53, which will be explained later in detail, is provided at both ends of the housing 22. The pair of impact absorbing members 53, 53 is accommodated in a pair of large diameter portion housings 52, 52 for the large diameter portions, one formed at one end side portion of the first housing 22a and the other formed at the other side end portion of the second housing 22b and is attached to a pair of restricting surfaces 52b, 52b (See FIG. 2). The impact absorbing members 53, 53 are disposed between the large diameter portions 51, 51 and the restricting surfaces 52b, 52b facing to the large diameter portions 51, 51 which are provided for stopping the straight line movement of the rack shaft 21. When the rack shaft 21 moves along in the A-axis direction and the steered wheels 26, 26 to be steered reach the maximum steerable angle, an "end butting" where the large diameter portion 51 collides with the impact absorbing member 53 occurs. The impact of the collision is absorbed by the impact absorbing member 53.

The steering assist mechanism 30 is a mechanism which applies a steering assist force to the steering mechanism 10 by a motor M, as a driving source, which is controlled based on the output of the torque detecting device 40. The steering assist mechanism 30 includes an electric equipment MCU (Motor Control Unit), a ball screw mechanism 33 and a driving force transmitting mechanism 35. It is noted here that the steering device ST of this embodiment is structured as a so-called rack parallel type electric power steering device.

The electric equipment MCU accommodated in a housing 31 includes the motor M and a control portion ECU for driving the motor M. A drive pulley of the driving force transmitting mechanism 35 is attached to an output shaft of the motor M. The ball screw mechanism 33 includes a ball screw portion 21b and a ball screw nut 33a (corresponding to nut of the invention). The ball screw nut 33a is engaged with the ball screw portion 21b of the rack shaft 21 via a plurality of balls. The driving force transmitting mechanism 35 includes the drive pulley, a toothed belt and a driven pulley and transmits the rotation driving force generated by the motor M between the drive pulley and the driven pulley via the toothed belt.

According to the structure explained above, the steering assist mechanism 30 drives the motor M in response to the rotation operation of the steering wheel 11 to rotate the output shaft. By the rotation of the output shaft, the rotation torque is transmitted to the drive pulley to rotate the drive pulley. The rotation of the drive pulley is transmitted to the driven pulley via the toothed belt. By the rotation of the driven pulley, the ball screw nut 33a, which is formed integrally with the driven pulley, is rotated. By the rotation of the ball screw nut 33a, the steering assist force in the axial direction is transmitted to the rack shaft 21 via the balls.

The torque detecting device 40 is fixed to an attachment opening portion 22e positioned surrounding the pinion shaft 15. The torque detecting device 40 detects a torsion amount of the torsion bar 15c and outputs signals to the control portion ECU in response to the torsion amount. It is noted that the torsion bar 15c referred here is a member having a torsional characteristics and is twisted in response to a difference in torque between an input shaft 15a and an output shaft 15b. The control portion ECU controls the output of the motor M by deciding the steering assist torque based on the output signal from the torque detecting device 40.

2. Damper Device

The damper device 50 will be explained with reference to FIG. 2 of the attached drawings. Accompanied by a forward input inputted in response to the steering operation by the driver of the vehicle, or accompanied by a reverse input inputted from an exterior of the vehicle via the steered wheel 26 to be steered, the large diameter portion 51 moves along in the A-axis direction and the impact absorbing member 53 of the damper device 50 absorbs impact to be generated when a collision of the large diameter portions 51 with the restricting surface 52b of the large diameter portion housing 52 is about to occur. The damper device 50 includes the rack shaft 21, the large diameter portion housing 52 and the impact absorbing member 53. It is noted that the damper device 50 according to this embodiment is provided at two portions, at right and left sides, relative to the steering device ST in the A-axis direction. It is noted further that the right side as viewed in FIG. 1 is referred to as "one side" and the left side in FIG. 1 is referred to as "the other side". Unless otherwise defined, the damper device 50 will be explained based on "the other side" damper device neighboring the steering assist mechanism 30 in FIG. 1.

As shown in FIG. 1, the rack shaft 21 of the damper device 50 includes the pair of large diameter portions 51, 51 and the shaft portion 211. Each of the large diameter portions 51, 51 is provided at each end portion of the rack shaft 21.

The shaft portion 211 is provided between the pair of large diameter portions 51, 51. The shaft portion 211 includes the ball screw portion 21b and the rack gear 21a. The large diameter portion 51 of the other side as shown in FIG. 2, is connected to a shaft portion 271 of the ball stud 27.

An end portion 511 positioned at the "one side" of the large diameter portion 51 is connected to the shaft portion 211. The diameter of the end portion 511 is formed to be larger than the diameter of the shaft portion 211. A male screw portion 51b is formed at the end portion 511 extending from the end portion 511 to the one side in the A-axis direction. At the central portion of the end surface 212 of the shaft portion 211 of the rack shaft 21 is provided a female screw portion 213 which opens to the other side in the A-axis direction and engages with the male screw portion 51b.

The contact end surface 51a is formed at the root portion of the male screw portion 51b and extends outwardly in a radial direction from the root portion of the male screw portion 51b. According to this embodiment, the contact end surface 51a is the most end surface 212 of the rack shaft 21. In other words, the contact end surface 51a serves as a so-called rack end. According to this structure, when the rack shaft 21 reciprocally moves in a straight line, the contact end surface 51a engages with the restricting surface 52b via the impact absorbing member 53 and serves as a stopper for restricting the reciprocal movement of the rack shaft 21.

Figure 2:
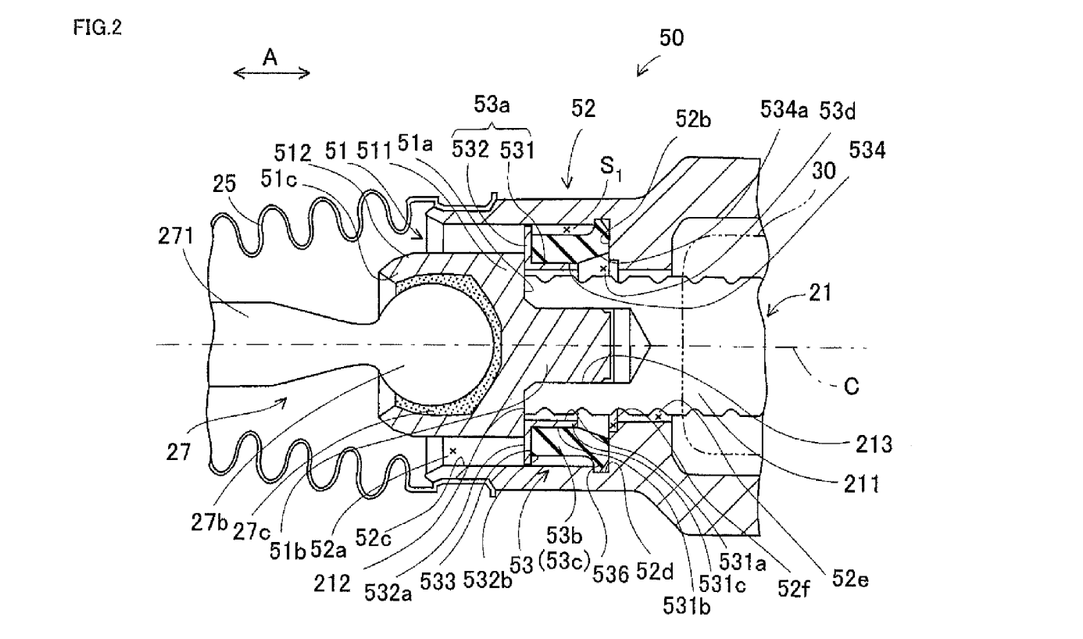
FIG. 2 is a cross sectional view of the structure of the damper device according to the embodiment.

The large diameter portion 51 includes a socket portion 51c, which accommodates the ball stud 27 therein, at the end portion 512 positioned at the other side as viewed in FIG. 2. A tip end of the ball stud 27 at the one side is formed of a spherical shape which is indicated as a ball portion 27b. The socket portion 51c rotatably accommodates the tip end of the ball portion 27b through a damper material 27c. In FIG. 2, the shaft portion 271 is formed at the other side of the ball stud 27. The end portion of the other side of the shaft portion 271 and the knuckle are connected through the tie rod 24. Thus, the large diameter portion 51 connects the ball stud 27 at the end portion 512 and is connected to the steered wheel 26 to be steered via the ball stud 27, the tie rod 24 and the knuckle (not shown). (See FIG. 1). When the rack shaft 21 moves in a straight line along in the A-axis direction, the tie rod 24 is swung about the ball portion 27b inserted into the large diameter portion 51. Then, the steered wheel 26 to be steered can be turned until the contact end surface 51a is engaged with the impact absorbing member 53 which is attached to the restricting surface 52b.

Each of the pair of large diameter portion housings 52, 52 forms a portion of the housing 22 and one of the large diameter portion housings 52, 52 forms an end portion at the one side of the first housing 22a and the other forms an end portion of the other side of the second housing 22b. The pair of the large diameter portion housings 52, 52 is formed of a substantially bottomed cylindrical shape and each is arranged in the A-axis direction with an opening open to respective steered wheels 26, 26 side. The rack shaft 21 is inserted into the pair of large diameter portion housings 52, 52 (housing 22) and is relatively movable in the A-axis direction. Each large diameter portion housing 52 includes a shaft accommodating portion 52e, a large diameter portion accommodating portion 52a, the restricting surface 52b, the inner peripheral surface 52c and the relief portion 52f.

As shown in FIG. 2, a shaft accommodating portion 52e and a large diameter portion accommodating portion 52a are cylindrical spaces respectively having substantially constant inner diameters and are formed co-axially with an A-axis. The shaft accommodating portion 52e accommodates the shaft portion 211 of the rack shaft 21, under the state that the shaft portion 211 is inserted into the shaft accommodating portion 52e. The inner diameter of the large diameter portion accommodating portion 52a is set to be larger than the inner diameter of the shaft accommodating portion 52e and is in communication therewith. The large diameter portion accommodating portion 52a is open to the side where the steered wheel 26 to be steered is positioned for accommodating the shaft portion 211 and the large diameter portion 51 therein.

The restricting surface 52b is a flat bottom surface side forming the bottom wall of the large diameter portion accommodating portion 52a and is formed facing toward the contact end surface 51a of the large diameter portion 51. The restricting surface 52b is brought into contact with the contact end surface 51a, which is the most end surface (rack end), through the impact absorbing member 53 to thereby restrict physically the range of movement of the rack shaft 21 in a straight line.

An inner peripheral surface 52c is an inner peripheral surface of the large diameter portion accommodating portion 52a and an end portion of the inner peripheral surface 52c having a common surface with the restricting surface 52b at the restricting surface 52b side is provided with an annular groove 52d which diameter is enlarged towards outwardly in a radial direction from the inner peripheral surface 52c. The annular groove 52d engages with an annular projection portion 536 to mount the impact absorbing member 53 on to the restricting surface 52b.

Figure 5A:
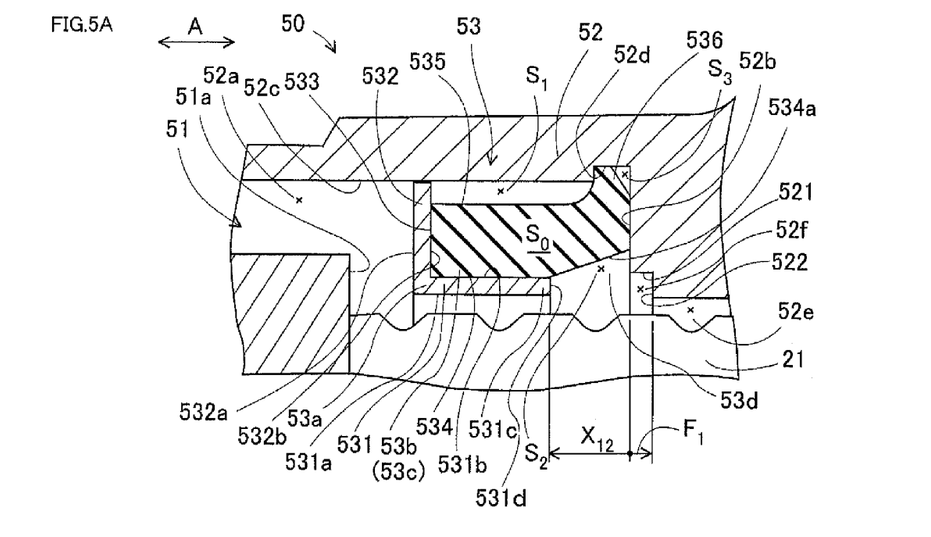
FIG. 5A is a cross sectional view of the state of the impact absorbing member before the end abutting.

The relief portion 52f is a recessed annular space area provided continuously with a step at the inner peripheral surface and the restricting surface 52b of the shaft accommodating portion 52e at the other side inwardly in a radial direction. The relief portion 52f is formed so that the end portion 531c of the cylindrical portion 531 can be inserted into the opposite side of the large diameter portion than the restriction surface 52b in the A-axis direction. In other words, the relief portion 52f allows the end portion 531c of the cylindrical portion 531 to escape into the space of the relief portion 52f and maintains the non-contact state between the impact receiving member 53a and the large diameter portion housing 52. As shown in FIG. 5A, the relief portion 52f is formed by an inner peripheral surface 521 which is larger in diameter than the outer peripheral surface 531b of the cylindrical portion 531 and a bottom surface 522 which faces to the end surface 531d of the cylindrical portion 531. In more detail, the inner diameter of the inner peripheral surface 521 is formed to be larger than the outer diameter of the outer peripheral surface 531b of the cylindrical portion 531 by one (1) mm. Further, the depth (distance) from the restriction surface 52b to the bottom surface 522 is formed to be $F_1$ mm.

3. Impact Absorbing Member

The impact absorbing member 53 is a member for absorbing a collision impact upon the "end abutting". The impact absorbing member 53 is inserted into the shaft portion 211 and is disposed between the contact end surface 51a of the large diameter portion 51 and the restricting surface 52b of the large diameter portion housing 52 in the A-axis direction. The impact absorbing member 53 is formed by the impact receiving member 53a which is made by a cylindrical steel plate having a flange portion 532 and the elastic body 53b made from a rubber material and having approximately a cylindrical shape. The impact absorbing member 53 is mounted on the restricting surface 52b of the large diameter portion housing 52 so that an end surface 532a to be contacted of the impact receiving member 53a faces to the contact end surface 51a of the large diameter portion 51.

Figure 3:
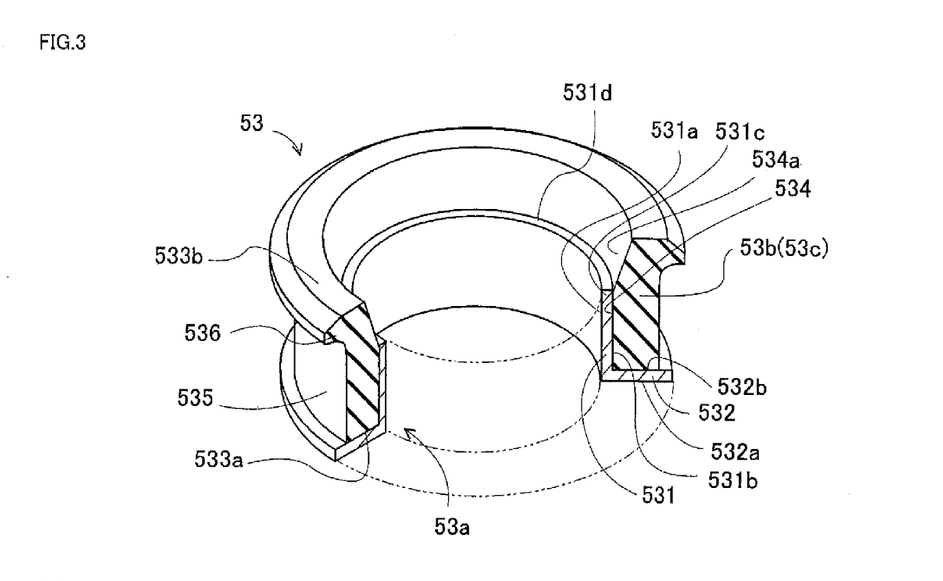
FIG. 3 is a partial perspective view of the impact absorbing member according to the embodiment.

In more detail, as shown in FIG. 3, the impact absorbing member 53 is approximately of an annular cylindrical shape in general with the cylindrical portion 531 of the impact receiving member 53a being inserted into a through-hole of the elastic body 53b. The impact absorbing member 53 is formed by integrally adhere the end surface 533a of the elastic body 53b at the other side to the impact receiving member 53a. An opening 53d is provided at the inner peripheral surface side of the impact absorbing member 53. By this opening 53d, the impact receiving member 53a opens by a clearance $X_{12}$ at the end portion at the one side, (See FIG. 2 and FIG. 5A). Then, the one side end portion of the inner peripheral surface 534 of the elastic body 53b under non-deformed state is exposed outside from the opening 53d.

The impact receiving member 53a includes the cylindrical portion 531 and the flange portion 532. The cylindrical portion 531 is positioned to face to the inner peripheral surface 52c of the large diameter portion housing 52 and the flange portion 532 extends outwardly in a radial direction from the cylindrical portion 531 and faces to the restricting surface 52b. Further, the flange portion 532 is formed to be contactable with the large diameter portion 51. In more detail, the cross section as viewed in the A-axis direction of the impact receiving member 53a is of an L-shape. One side of the L-shape of the cylindrical portion 531 is indicated as a horizontal side in the A-axis direction and the other side of the L-shape is indicated as a vertical side which crosses the A-axis direction. When the impact receiving member 53a receives an impact force at the flange portion 532 caused by a contact or a collision from the contact end surface 51a of the large diameter portion 51, the impact receiving member 53a applies a compression force on the elastic body 53b to transmit the impact thereto and absorbs the impact thereby.

Figure 5B:
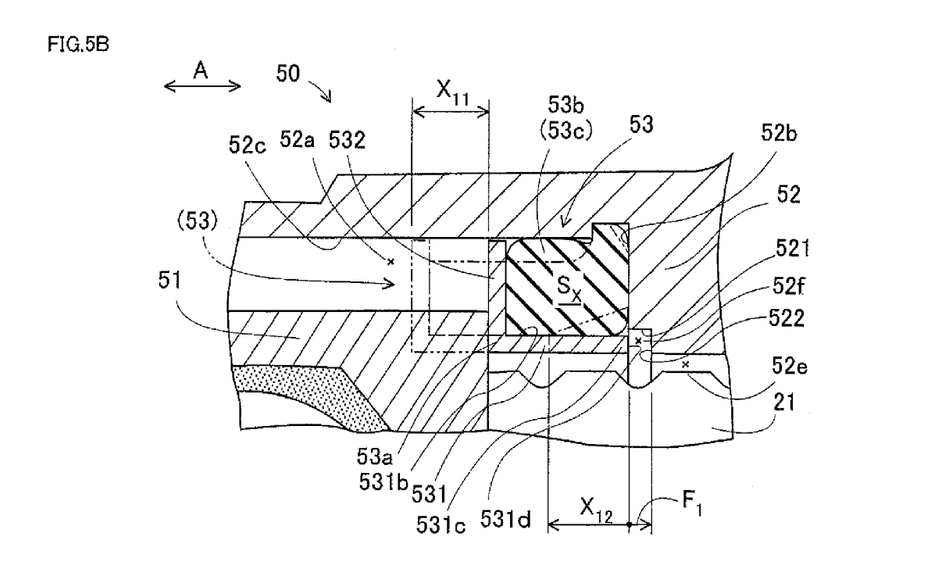
FIG. 5B is a cross sectional view of the state of the damper device when a normal impact force is applied to the impact absorbing member.

The cylindrical portion 531 is formed of approximately a straight cylindrical shape. The through-hole of the impact absorbing member 53 is provided at the inner peripheral surface 531a of the cylindrical portion 531 for inserting the shaft portion 211 therethrough, under the cylindrical portion 531 being assembled to the large diameter portion housing 52. The size of the outer diameter of the inner peripheral surface 531b of the cylindrical portion 531 is set so that the inner peripheral surface 534 of the elastic body 53b can be loosely inserted therein. The entire length of the cylindrical portion 531 in the A-axis direction is set depending on the later described compression displacement $X_{11}$ of the impact absorbing member 53. As shown in FIGS. 5A and 5B, the entire length of the cylindrical portion 531 is set so that the axial clearance $X_{12}$ in the A-axis direction between the end surface 531d of the cylindrical portion 531 under non-deformed state and the restriction surface 52b becomes approximately the same with the compression displacement $X_{11}$. The cylindrical portion 531 is used for restricting the direction of the compression displacement of the inner peripheral surface 534 of the elastic body 53b to be along in the A-axis direction and further, the cylindrical portion 531 is also used for preventing the elastic body 53b from deforming inwardly in a radial direction to protrude beyond the cylindrical portion 531.

The flange portion 532 is formed of an annular plate shape with a constant thickness. The flange portion 532 extends from the cylindrical portion 531 outwardly in a radial direction. The outer diameter of the flange portion 532 is set to be slightly smaller than the inner diameter of the inner peripheral surface 52c of the large diameter portion housing 52 (set to have a clearance of about 0.15 to 0.6 mm therebetween). The other side end surface 533a of the elastic body 53b is assembled to the rear surface 532b of the end surface 532a to be contacted, which is the annular end surface of the flange portion 532 at the other side. The end surface 532a to be contacted of the flange portion 532 directly receives an impact force generated by a contact or a collision of the end surface 532a to be contacted with the contact end surface 51a of the large diameter portion 51 and the impact received is transmitted to and absorbed by the elastic body 53b.

Next, the elastic body 53b will be explained hereinafter. It is noted here that unless otherwise defined, the explanation will be made for the elastic body under non-deformed state. The collision impact that the impact receiving member 53a receives upon a direct contact between the impact receiving member 53a and the large diameter portion 51 is transmitted to the elastic body 53b which absorbs the impact by being deformed within the predetermined space. The elastic body 53b is disposed in an initially set space $S_0$ which is formed by the inner peripheral surface 52c of the large diameter portion housing 52, the restricting surface 52b, the outer peripheral surface 531b of the cylindrical portion 531 and the flange portion 532.

In more detail, the elastic body 53b has a shape in general wherein a flange shaped annular projection portion 536 is provided at an approximately straight cylindrical shaped main body portion 53c at the one side end portion in the A-axis direction. The annular projection portion 536 projects outwardly in a radial direction from the main body portion 53c. The inner diameter of the main body portion 53c is set to be slightly larger than the outer diameter of the outer peripheral surface 531b of the cylindrical portion 531 and is loosely inserted into the outer peripheral surface 531b. The outer diameter of the main body portion 53c is set to be smaller than the outer diameter of the flange portion 532. A clearance $S_1$ with a predetermined volume is formed between the main body portion 53c and the inner peripheral surface 52c under the main body portion 53c being assembled to the large diameter portion housing 52. The elastic body 53b is disposed within the initially set space $S_0$ by engaging the annular projection portion 536 with the annular groove 52d provided at the restricting surface 52b and projecting outwardly in a radial direction from the inner peripheral surface 52c.

An enlarged diameter portion 534a is provided at a corner portion of the inner peripheral surface 534 of the elastic body 53b where the restricting surface 52b is positioned. The diameter of the enlarged diameter portion 534a is enlarged towards the restricting surface 52b. The enlarged diameter portion 534a is formed with an inclination wherein the diameter thereof is enlarged from the position of the end portion 531c of the cylindrical portion 531 towards the restricting surface 52b in the A-axis direction. The corner portion of the inner peripheral surface 534 facing the opening 53d is properly inclined with an angle which can suitably separate from the outer peripheral surface 531b of the cylindrical portion 531 upon the compressive deformation. Thus, when the elastic body 53b is deformed by compression, the inner peripheral surface 534 (enlarged diameter portion 534a) at the opening 53d would not be bitten in the end portion 531c of the cylindrical portion 531.

An annular projection portion 536 is provided at the corner portion of the outer peripheral surface 535 of the elastic body 53b where the restricting surface 52b is positioned. The projection portion 536 projects from the main body portion 53c outwardly in a radial direction. The annular projection portion 536 is engaged in the annular groove 52d which is rectangular shape in vertical cross section of the large diameter portion housing 52 and assembles the restricting surface 52b thereon. As shown in FIG. 5A, one side end surface of the annular projection portion 536 is inclined so that the diameter thereof becomes reduced towards the restricting surface 52b. Thus, a triangular clearance $S_3$ between the annular projection portion 536 and the annular groove 52d in vertical cross section under the state that the projection portion 536 is engaged in the groove 52d.

Each end surface 533a, 533b of the other side and the one side of the elastic body 53b is formed to be of a flat shape (See FIG. 3). The end surface 533a of the other side is adhered to the rear surface 532b of the flange portion 532. On the other hand, the inner peripheral surface 534 of the elastic body 53b is not adhered to the outer peripheral surface 531b of the cylindrical portion 531. Adhesion area is formed at the entire surface of the end surface 533a of the other side of the elastic body 53b in order to ensure the maximum adhesive area. When a rubber material is used for the elastic body, a predetermined adhesive agent is applied on the rear surface 532b of the flange portion 532 and after the un-vulcanized rubber is injected towards the rear surface 532b exposed in the metal mold, the flange portion 532 is adhered to the elastic body 53b by vulcanization.

The material of the elastic body according to the invention is not limited and any material may be used as long as such material is formed to express a rubber like elasticity. For example, such as a crosslinked rubber, a thermoplastic or thermosetting synthetic resin system elastomer or the like can be used for forming the elastic body. As the crosslinked rubber, a diene based rubber, such as, natural rubber, butadiene rubber, isoprene rubber, chloroprene rubber, styrene-butadiene rubber, acrylonitrile-butadiene rubber (hereinafter referred to also as "NBR"), etc. and a rubber to which a hydrogen is added to an unsaturated portion thereof or the like, as the thermosetting synthetic resin system elastomer, an olefin system rubber such as ethylene-propylene rubber, butylene rubber, acryl rubber, urethane rubber, silicone rubber, fluoro rubber, etc., and as the thermoplastic synthetic resin system elastomer, an elastomer such as styrene system, olefin system, polyester system, polyurethane system, polyamide system, vinyl chloride or the like are exampled. According to the embodiment of the invention, as the material for the elastic body 53b used in the impact absorbing member 53 to be installed in the large diameter portion housing 52 of the steering device ST, considering the issues of heat-resistance, cold resistance and weatherability performance, NBR, chloroprene rubber, butyl rubber, ethylene-propylene rubber, etc., may be suitably applied, and further, considering the oil resistance, NBR or chloroprene rubber having polar group may be suitably applied.

4. Relative Movement Restriction by Elastic Body

Next, the operation of the steering device ST equipped with the damper device 50 according to the embodiment will be explained hereinafter. The steering device ST can be durable against an excessive impact force which is less likely to be generated in practical use. It is noted here that regarding to the expression "excessive impact force", the expression "under abnormal state" will be used properly and regarding to the impact force which would normally be assumed to be generated, the expression "under normal state" will be used to differentiate the state from the "abnormal state". The explanation will be made with reference to FIGS. 4, 5A through 5C.

FIG. 5A is a view of the impact absorbing member 53 under non-deformed state being disposed in the large diameter portion housing 52. As shown in FIG. 2, the main body portion 53c of the elastic body 53b is disposed in the initially set space $S_0$ formed by the inner peripheral surface 52c of the large diameter portion housing 52, the restricting surface 52b of the large diameter portion housing 52, the outer peripheral surface 531b and the flange portion 532. The elastic body 53b, the cylindrical portion 531 and the inner peripheral surface 52c are co-axially arranged relative to the center axis line of the rack shaft 21. (See FIG. 2). The restricting surface 52b of the large diameter portion housing 52 and the flange portion 532 are respectively arranged in a vertical direction relative to the center axis line of the rack shaft 21 and are positioned in parallel with each other.

When the large diameter portion 51 does not apply the impact force on the flange portion 532, the elastic body 53b is disposed in the large diameter portion housing 52 with the clearance $S_1$ from the inner peripheral surface 52c thereof. Further, the elastic body 53b is disposed with a clearance $S_2$ on an outer peripheral surface of the cylindrical portion 531, which is an imaginal outer peripheral surface formed assuming that the end surface 531d of the cylindrical portion 531 extends to the position of the restricting surface 52b in the A-axis direction. Further, the elastic body 53b is disposed between the annular projection portion 536 and the annular groove 52d with a clearance $S_3$. The volume of the initially set space $S_0$ is formed to be the value approximately the same with the volume which is the sum of the volume Vr of the elastic body 53b and the total volume Vs of each gap $S_1$ through $S_3$. The end surface 531d of the cylindrical portion 531 is arranged to have the clearance $X_{12}$ with the restricting surface 52b in the A-axis direction. The clearance $X_{12}$ corresponds to the compression displacement $X_{11}$ in the A-axis direction upon receipt of the impact force under the normal state. (See FIG. 5B). The end surface 531d faces to the bottom surface 522 of the relief portion 52f with a clearance corresponding to the depth $F_1$ in the opposite side of the large diameter portion in addition to the clearance $X_{12}$.

Figure 4:
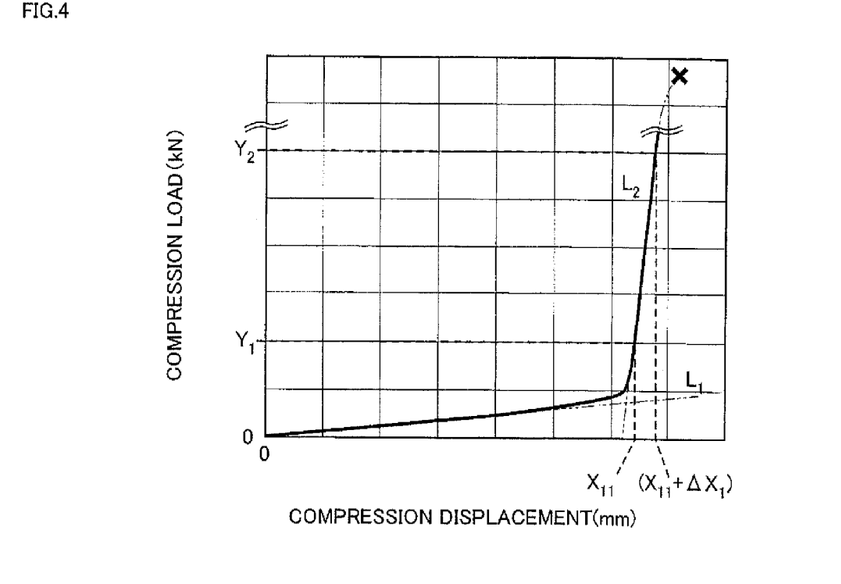
FIG. 4 is a graph showing a relationship between the compression load and the displacement of the impact absorbing member.

The impact absorbing member 53 has a relationship between the compression load and the compression displacement as shown in a graph shown in FIG. 4, when the elastic body 53b is formed by a predetermined NBR material. The elastic body 53b exhibits the linear rubber like elasticity complied with the characteristic of the line L1 within a predetermined range of the compression load, but when the compression load becomes large beyond the predetermined range, the elastic body 53b exhibits the elasticity complied with the characteristic of the line L2 and the rigidity of the elastic body 53b becomes high to be cured. When the large diameter portion 51 applies the impact force on the flange portion 532, the elastic body 53b is pressed in the A-axis direction by the restricting surface 52b and the flange portion 532 and deformed by compression to fill the space occupied by the gaps $S_1$ through $S_3$. At the initial stage of the compressive deformation where the clearance $X_{12}$ between the end surface 531d of the cylindrical portion 531 and the restricting surface 52b is gradually shortened, the collision impact is absorbed by the rubber like elasticity complied with the characteristic of the line L1.

FIG. 5B illustrates the state where the impact absorbing member 53 receives the impact force which compressively deforms the elastic body 53b of the impact absorbing member 53 so that the inside of the compression space Sx is filed with the elastic body 53b. In detail, this state indicates an imaginary case where an impact force which is larger than the impact force at the time of forward inputting and which is about the same to the impact force generated upon the vehicle running over the curbstone is reversely inputted. The impact force of this case approximately corresponds to the compression load Y1 [k N]. (See FIG. 4). The elastic body 53b is compressively deformed so that the elastic body 53b is brought into contact with all of the inner peripheral surface 52c of the large diameter portion housing 52, the restricting surface 52b of the large diameter portion housing 52, the outer peripheral surface 531b of the cylindrical portion 531 and the flange portion 532 after the compression displacement $X_{11}$ in the A-axis direction. At this time, the position of the end surface 531d of the cylindrical portion 531 is approximately the same position to the restricting surface 52b in the A-axis direction. This position in the A-axis direction indicates the position of the end surface 531d immediately before entering into the relief portion 52f. Under this state, the end surface 531d and the bottom surface 522 are separately positioned in the A-axis direction with each other having a clearance corresponding to the depth $F_1$ therebetween. The elastic body 53b is substantially filled in the compression space Sx. The volume of the elastic body 53b after compressive deformation is the same as the volume before the compressive deformation due to the non-compressive fluid characteristic of the elastic body 53b having a rubber like elasticity. Therefore, the volume of the compression space Sx is approximately the same with the volume Vr of the elastic body 53b. The volume change ($S_0$–Sx) between before and after the compressive deformation is considered to be approximately the same with the total volume Vs of the gaps $S_1$ through $S_3$.

The elastic body 53b is disposed in the compression space Sx formed by the large diameter portion housing 52 and the impact receiving member 53a and sealed therein with a sealing contact therewith. The compression space Sx has a slight gap between the inner peripheral surface 521 of the relief portion 52f and the outer peripheral surface 531b of the cylindrical portion 531. However, basically the space does not have a passage through which the elastic body 53b overflows outside from the compression space Sx. Accordingly, the elastic body 53b cannot be compressively deformed further within the compression space Sx which volume is substantially the volume Vr and is saturated in volume. Accordingly, the elastic body keeps continuing the disposed state between the flange portion 532 and the restricting surface 52b to thereby preventing the impact receiving member 53a from displacing in the opposite side of the large diameter portion in the A-axis direction. As shown in FIG. 4, the performance of the rubber characteristic of the elastic body 53b which is compressively displaced with the compression displacement $X_1$ (mm) receiving the compression load Y1 [k N] is indicated as the state where the performance line has just changed from the line L1 to L2. Under this state, the rigidity of the elastic body 53b has been increased. Thus, the impact absorbing member 53 which has compressively deformed with the compression displacement $X_{11}$ (mm) in the A-axis direction is difficult to be further displaced even an impact force larger than the compression load Y1 [k N] is applied. When receiving an impact force at normal state applied upon the vehicle running over the curbstone which not often occurs but practically may occur, the end surface 531d of the cylindrical portion 531 and the bottom surface 522 of the relief portion 521 are separated with each other having a space corresponding to the depth $F_1$ and the non-contact state between the metal made impact receiving member 53a and the metal made large diameter portion housing 52 can be surely maintained. Thus, the impact transmitting restriction of the steering device under normal state can be effectively performed.

Figure 5C:
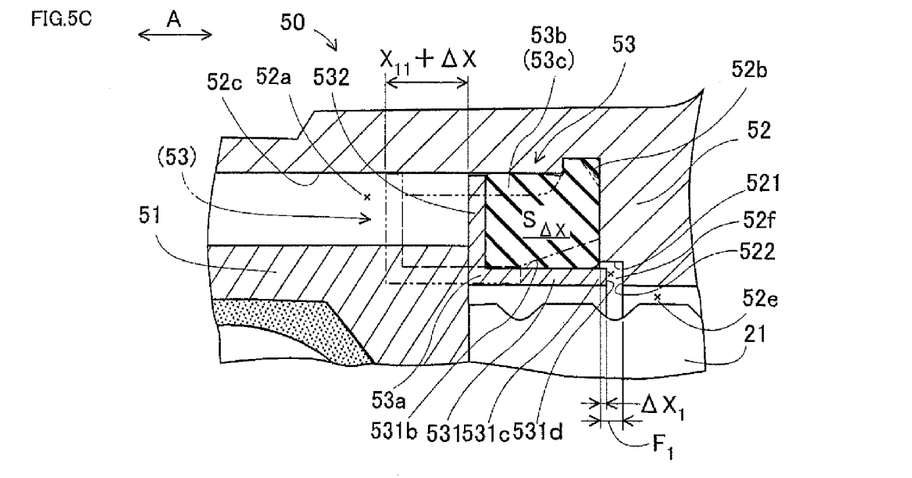
FIG. 5C is a cross sectional view of the state of the damper device when an impact force is applied to the impact absorbing member under abnormal condition.

FIG. 5C illustrates the state that the impact absorbing member 53 receives the impact force under abnormal state. In other words, FIG. 5C shows the state that the impact absorbing member 53 receives an excessive impact force. Under this state, the compression load Y2 [k N] (three times bigger than the load Y1) is assumed to be applied. (See FIG. 4). As illustrated in the drawing, the elastic body 53b shown in FIG. 5C is further compressively displaced towards the opposite side of the large diameter portion in the A-axis direction by the value $\Delta X_1$ compared to the case where the impact force applied under the normal state as explained above. Accompanied by the compressive deformation of the elastic body 53b, the impact receiving member 53a is also displaced in the A-axis direction by the value ($X_{11}+\Delta X_1$) from the position at non-deformed state. The elastic body 53b within the compression space S$\Delta$x expands in the space approaching closer to the 100% filling ratio and finally the volume thereof is saturated such that the compressive deformation cannot be possible anymore. The elastic body 53b keeps continuing the disposed state between the flange portion 532 and the restricting surface 52b. On the other hand, the end portion 531c of the cylindrical portion 531 is displaced towards the opposite side of the large diameter portion further than the restricting surface 52b along in the A-axis direction so that the end surface 531d is advanced into the relief portion 52f by the distance $\Delta X_1$. As explained, under the state that the performance of the rubber characteristic of the elastic body 53b complies with the characteristic of the line L2 under the displaced state by the compression displacement $X_{11}$ (mm). The rigidity of the elastic body 53b becomes suddenly great. The displacement of the impact receiving member 53 stops when the displacement value becomes $\Delta X_1$, even the compression load becomes increased up to the value Y2 [k N]. This displaced distance $\Delta X_1$ corresponds to the value of one sixteenth (1/16) of the value $X_{11}$. By setting the depth $F_1$ up to the bottom surface 522 of the relief portion 52f keeping sufficient allowance, based on the value $\Delta X_1$ as a reference value, the non-contact state between the impact receiving member 53a and the large diameter portion housing 52 can be surely realized even when the impact force under the abnormal state is applied.

When receiving an excessive impact under the abnormal state from the exterior, the impact force transmitted to the damper device 50 depends on the vehicle speed at the time and the vehicle weight. According to the example above, it is assumed that the impact load of Y2 [k N] is reversely inputted. However, it is possible to set the impact load that is two or three times greater than the impact load of Y2 [k N]. Based on the rubber characteristic of the elastic body 53b shown in FIG. 4, the reference value $\Delta X$, (mm) for the depth $F_1$ to the bottom surface 522 is obtained similarly. Based on the reference value $\Delta X_1$ (mm), the depth $F_1$ can be properly obtained to realize the non-contact state between the impact receiving member 53a and the large diameter portion housing 52. Even when the impact force under the abnormal state is applied, the impact transmitting restriction effect on the drive force transmitting mechanism 35 associated with the steering assist mechanism 30 arranged adjacent to the damper device 50 can be achieved. Under such state, the steering function such as steering wheel operation or the like can be maintained and any choices of countermeasure when necessary can be assured. It is noted that in FIG. 4 the bold character "X" in the graph shows the imaginary limit point where the elastic body may be destroyed. The impact is absorbed to the maximum limit and the transmission of the impact force to each component of the steering device ST can be suppressed from the time when the impact absorbing member 53 receives the impact force from the large diameter portion 51 and compressed until it is destroyed. As a result, providing for a case where an excessive impact force is applied under unexpected circumstances. The function of the steering device ST can be maintained.

5. Modified Embodiments

Next, the damper device 60 and 70 according to the modified embodiments will be explained. In FIGS. 6A, 6B, 7A and 7B, the same portions corresponding to the damper device 50 are referenced with the same numerals or symbols. Regarding the damper device 60 according to the first modified embodiment, the shapes of the restricting surface 62b, the elastic body 63b and the relief portion 62f are different from those of the damper device 50.

Figure 6A:
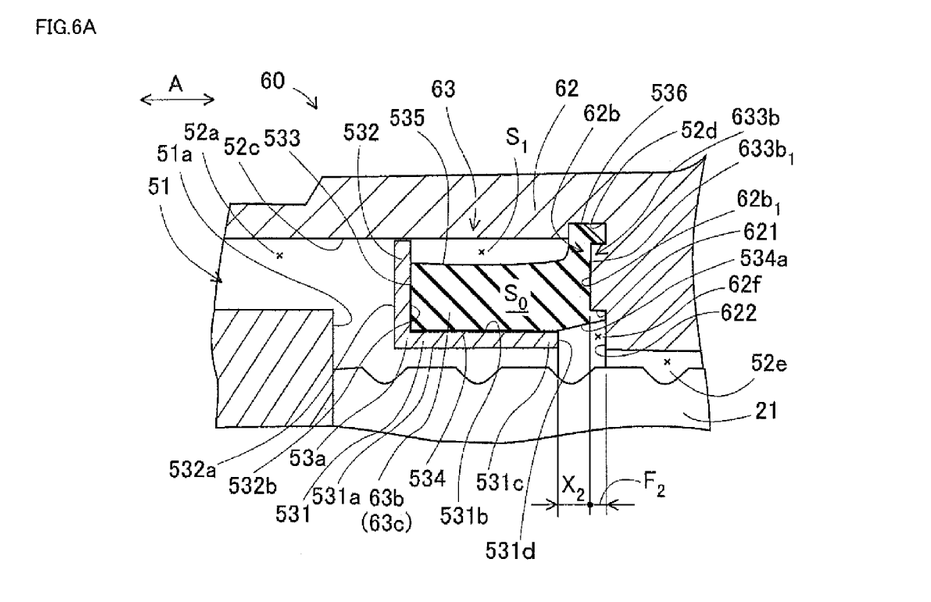
FIG. 6A is a cross sectional view of the damper device before the end abutting according to a modified embodiment 1.

As shown in FIG. 6A, the restricting surface 62b includes an annular projection bottom surface 62b1 having a step with a height $F_2$ in the A-axis direction at a central portion of the annular bottom wall of the large diameter portion accommodating portion 52a in a radial direction. The elastic body 63b includes an annular recessed portion 633b1 at a central portion of the one side end surface 633b in a radial direction and the annular recessed portion 633b1 is engaged with the annular projection bottom surface 62b1. The inner peripheral surface side wall portion forming the annular recessed portion 633b1 is internally in contact with the step surface of the projection bottom surface 62b1. The relief portion 62f is provided continuously inwardly in a radial direction from the projection bottom surface 62b1 and is provided as a recess having a stepped shape area relative to the projection bottom surface 62b1. The relief portion 62f has a bottom surface 622 facing to the end surface 531d of the cylindrical portion 531. The inner peripheral surface 621 of the relief portion 62f corresponds to the stepped surface at the inner peripheral side of the projection bottom surface 62b1. The diameter of the inner peripheral surface 534 (534a) of the elastic body 63b which enters into the inner peripheral surface 621 and the area of the relief portion 62f is larger than the diameter of the outer peripheral surface 531b of the cylindrical portion 531. The relief portion 62f is formed so that the end portion 531c of the cylindrical portion 531 can advance further to the opposite side of the large diameter portion than the projection bottom surface 62b1 in the A-axis direction.

Figure 6B:
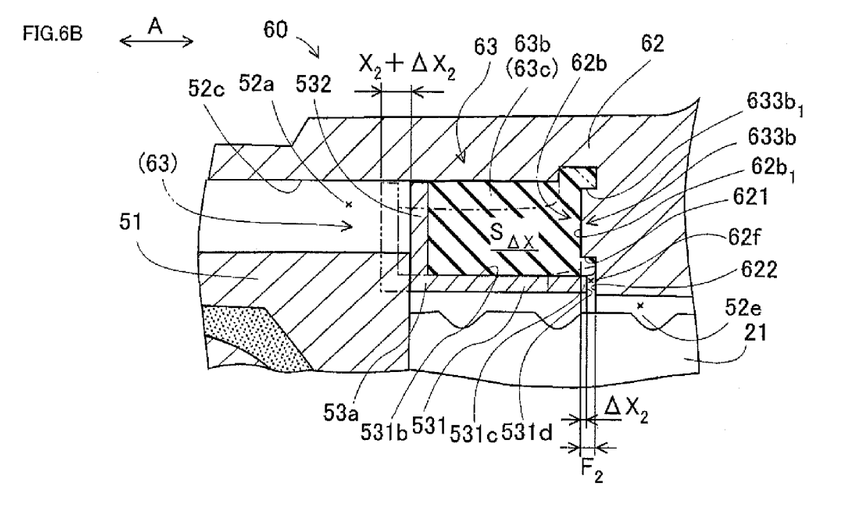
FIG. 6B is a cross sectional view of the damper device after the end abutting according to the modified embodiment 1.

As shown in FIG. 6B, the impact receiving member 53a according to the first modified embodiment receives the impact force and is displaced by the distance "$X_2+\Delta X_2$". The end portion 531c of the cylindrical portion 531 advances into the relief portion 62f by the displacement distance $\Delta X_2$ and the end surface 531d of the cylindrical portion 531 keeps the non-contact state with the large diameter portion housing 62 of the housing 22. The impact receiving member 53a is restricted from relative movement by the elastic body 63b which has been filled in the compression space S$\Delta$x relative to the large diameter portion housing 62 (housing 22). Thus, the same effect with the effect achieved by the damper device 50 can be achieved by the impact absorbing member 63 of the damper device 60 of this embodiment.

Figure 7A:
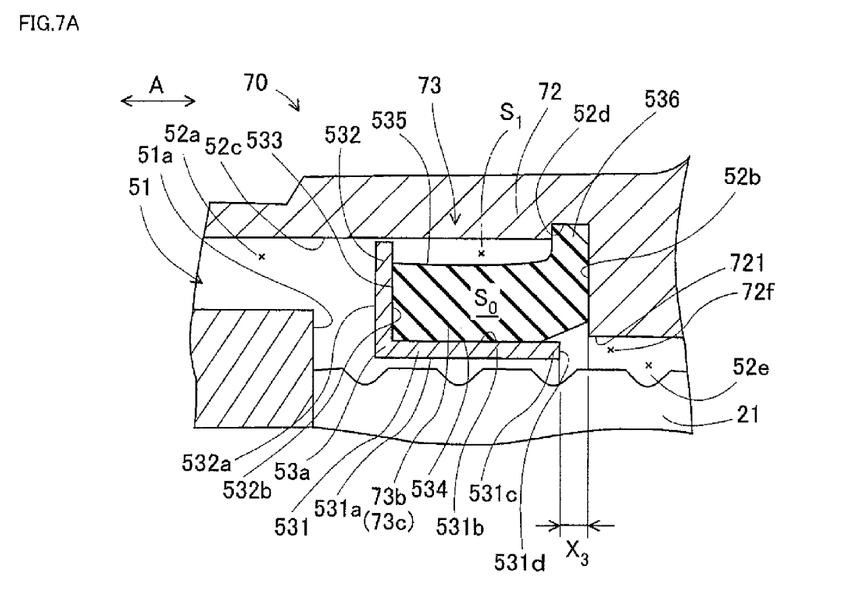
FIG. 7A is a cross sectional view of the damper device before the end abutting according to a modified embodiment 2.

The damper device 70 according to the second modified embodiment differs from the damper device 50 in the structure of the relief portion 72f. As shown in FIG. 7A, the relief portion 72f is formed in a space area between the inner peripheral surface 721 of the shaft accommodation portion 52e and the outer peripheral surface of the rack shaft 21. The relief portion 72f has an inner peripheral surface 721 which inner diameter is larger than the outer diameter of the outer peripheral surface 531b of the cylindrical portion 531. The relief portion 72f is formed so that the end portion 531c of the cylindrical portion 531 can advance further to the opposite side of the large diameter portion than the restricting surface 52b in the A-axis direction.

Figure 7B:
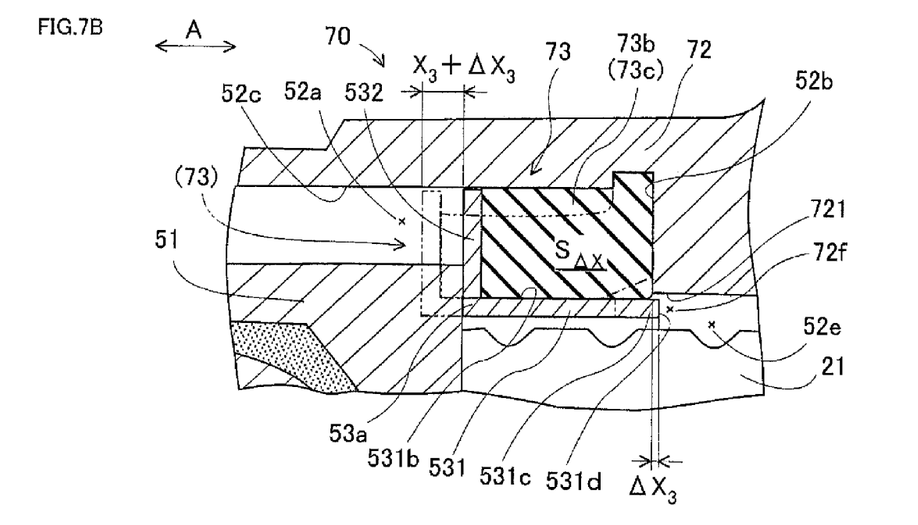
FIG. 7B is a cross sectional view of the damper device after the end abutting according to the modified embodiment 2.

As shown in FIG. 7B, the impact receiving member 53a according to the second modified embodiment receives the impact force and is displaced by the distance "$X_3+\Delta X_3$". The end portion 531c of the cylindrical portion 531 advances into the relief portion 72f by the displacement distance $\Delta X_3$ and the end surface 531d of the cylindrical portion 531 keeps the non-contact state with the large diameter portion housing 72 of the housing 22. The impact receiving member 53a is restricted from relative movement by the elastic body 73b which has been filled in the compression space S $\Delta$x relative to the large diameter portion housing 72 (housing 22). Thus, the same effect with the effect achieved by the damper device 50 can be achieved by the impact absorbing member 73 of the damper device 70 of this embodiment.

The invention is not limited to the embodiments explained above. For example, according to the above embodiments, upon receipt of an excessive impact force, under the state before the end portion 531c of the cylindrical portion 531 enters into the relief portion 52f, 62f and 72f, the elastic body 53b, 63b and 73b is filled in the compression space or the rigidity of the elastic body 53b, 63b and 73b is suddenly largely changed. However, before the end portion 531c of the cylindrical portion 531 enters into the relief portion 52f, 62f and 72f, the elastic body 53b, 63b and 73b is not necessarily filled in the compression space or is not necessarily suddenly and largely cured. Even under the state that the elastic body 53b, 63b and 73b is not filled in the compression space, as long as the end portion 531c of the cylindrical portion 531 enters into the relief portion 52f, 62f and 72f and yet keeping the impact receiving member 53a to be non-contact state with the large diameter portion housing 52, 62 and 72 (housing 22) and the relative movement of the impact receiving member 53a and the large diameter portion housing 52, 62 and 72 (housing 22) can be restricted by the deformed elastic body 53b, 63b and 73b, the assurance of the avoiding of the collision between the metal materials can be improved. According to the embodiments as shown in FIG. 4, the performance of the rubber characteristic is suddenly changed from the characteristic of the line L1 to the characteristic of the line L2. However, the performance is not limited to this. Generally, the material with a rubber like elasticity has a tendency that the larger the compression displacement, the larger the rigidity becomes. However, the performance change depends on the individual rubber materials or the shape thereof. It is also noted that according to the embodiments above, the impact absorbing member 53, 63 and 73 is assembled to the large diameter portion housing 52, 62 and 72 (housing 22). However, the structure that the impact absorbing member 53, 63 and 73 is installed in the large diameter portion 51 and that the impact body absorbs the impact keeping the elastic body to be in contact with the restricting surface 52b and 62b can be considered within the scope of the invention.

6. Advantageous Effects of the Embodiments

According to the embodiments above, in the damper device 50, 60 and 70, the impact absorbing member 53, 63 and 73 includes an impact receiving member 53*a* which is equipped with a cylindrical portion 531 facing to the inner peripheral surface 52*c* of the large diameter portion housing 52, 62 and 72 (housing 22) and a flange portion 532 extending outwardly in a radial direction from the cylindrical portion 531, facing to the restricting surface 52*b* and 62*b* and being contactable with the large diameter portion 51 and an elastic body 53*b*, 63*b* and 73*b* provided in an initially set space $S_0$ formed by the inner peripheral surface 52*c* of the large diameter portion housing 52, 62, and 72 (housing 22), the restricting surface 52*b* and 62*b*, an outer peripheral surface 531*b* of the cylindrical portion 531 and the flange portion 532 and formed by a rubber material or a synthetic resin material having a rubber-like elasticity. The large diameter portion housing 52, 62 and 72 (housing 22) includes a relief portion 52*f*, 62*f* and 72*f* defined by an area provided continuously inwardly in a radial direction of the restricting surface 52*b* and 62*b* wherein an end portion 531*c* of the cylindrical portion 531 can be advanced further towards an opposite side to the large diameter portion than the restricting surface 52*b* and 62*b* along in an A-axis direction. When the large diameter portion 51 does not apply an impact force to the flange portion 532, the elastic body 53*b* is disposed having a gap $S_1$ through $S_3$ relative to at least one of the inner peripheral surface 52*c* of the housing 52, 62 and 72 (housing 22) and the outer peripheral surface 531*b* of the cylindrical portion 531. When the large diameter portion 51 applies the impact force to the flange portion 532, the elastic body 53*b*, 63*b* and 73*b* is compressed in the A-axis direction by the restricting surface 52*b* and 62*b* and the flange portion 532. Therefore, the elastic body 53*b*, 63*b* and 73*b* is deformed to fill up the gap $S_1$ through $S_3$ so that the inner peripheral surface 52*c* of the large diameter portion housing 52, 62 and 72 (housing 22), the restricting surface 52*b* and 62*b*, the outer peripheral surface 531*b* of the cylindrical portion 531 and the flange portion 532 are all brought into contact with the elastic body 53*b*, 63*b* and 73*b*. Then the movement of the impact receiving member 53*a* relative to the large diameter portion housing 52, 62 and 72 (housing 22) is restricted by the deformed elastic body 53*b*, 63*b* and 73*b*, maintaining a non-contact state of the impact receiving member 53*a* relative to the large diameter portion housing 52, 62 and 72 (housing 22) by an advancing movement of the end portion 531*c* of the cylindrical portion 531 into the relief portion 52*f*, 62*f* and 72*f*.

The escaping area for enabling the end portion 531*c* of the cylindrical portion 531 to advance therein when the large diameter portion 51 applies the impact force to the flange portion 532 is ensured by the relief portion 52*f*, 62*f* and 72*f* to surely avoid the contact between the impact receiving member 53*a* and the housing 52, 62 and 72. Accordingly, the effect of dampening the impact force transmitted to each component of the device is surely achieved.

According to the above embodiments, when the impact is applied on the flange portion 532 from the large diameter portion 51 under the state before the end portion 531*c* of the cylindrical portion 531 enters into the relief portion 52*f*, 62*f* and 72*f*, the elastic body 53*b*, 63*b* and 73*b* is deformed into a state that the elastic body is brought into contact with all of the inner peripheral surface 52*c* of the housing 52, 62, 72 (housing 22), the restricting surface 52*b*, the outer peripheral surface 531*b* of the cylindrical portion 531 and the flange portion 532 to be filled in the gap $S_1$ through $S_3$. Thus, the relative movement of the impact receiving member 53*a* relative to the large diameter portion housing 52, 62 and 72 is restricted by the deformed elastic body 53*b*, 63*b* and 73*b*. Accordingly, when a relatively frequently generated normal impact force is applied on the flange portion 532, the relative movement of the cylindrical portion 531 relative to the large diameter portion housing 52, 62 and 72 is restricted before the cylindrical portion 531 enters into the relief portion 52*f*, 62*f* and 72*f*. Further, when a not frequently generated abnormal impact force is applied on the flange portion 532, the relative movement of the cylindrical portion 531 relative to the large diameter portion housing 52, 62 and 72 can be also restricted under the state that the cylindrical portion 531 enters into the relief portion 52*f*, 62*f* and 72*f*. As a result, the reliability of the device adapted to be applied an excessive impact force is increased.

Further, according to the embodiments, the relief portion 52*f* and 62*f* includes the inner peripheral surface 521 and 621 which inner diameter is larger than the outer diameter of the outer peripheral surface 531*b* of the cylindrical portion 531 and the bottom surface 522 and 622 facing to the end surface 531*d* of the cylindrical portion 531. Accordingly, by performing a simple minimum machining on the large diameter portion housing 52 and 62 (housing 22), the strength thereof can be maintained without reducing necessary strength and the effect of the invention can be achieved in an economical way.

Further, the steering device ST provided with any one of the damper devices 50, 60 and 70 of the embodiments above. The steering device ST provided with the rack shaft 21 which is connected to a steered wheels 26,26 via tie rods 24 24 at both ends thereof and is reciprocally movable in an axial direction to turn the steered wheels 26,26, and large diameter portions 51, 51 provided at both ends of the rack shaft 21, to which the tie rods are pivotally connected, and the housing 22 for accommodating the rack shaft 21. Thus, the steering device ST which can achieve the advantageous effects of the damper devices 50, 60 and 70.

Obviously, numerous modifications and variations of the present invention are possible in light of the above teachings. It is therefore to be understood that within the scope of the appended claims, the present invention may be practiced otherwise than as specifically described herein.

The invention claimed is:
1. A damper device comprising;
a shaft having a shaft portion and a large diameter portion;
a housing formed in a cylindrical shape and through which the shaft is inserted, the shaft being movable in an axial direction relative to the housing, the housing being provided with a restricting surface facing toward an end surface side of the large diameter portion; and
an impact absorbing member inserted on the shaft portion and disposed between the end surface of the large diameter portion and the restricting surface in an axial direction, wherein the impact absorbing member includes;
an impact receiving member including a cylindrical portion facing to an inner peripheral surface of the housing and a flange portion extending from the cylindrical portion outwardly in a radial direction and facing to the restricting surface and being contactable with the large diameter portion; and
an elastic body provided in a space formed by the inner peripheral surface of the housing, the restricting surface, an outer peripheral surface of the cylindrical portion and the flange portion and formed by a rubber material or a synthetic resin material having a rubber-like elasticity, and wherein, the housing includes a relief portion defined by an area provided continuously inwardly in a radial direction from the restricting surface, wherein an end portion of the cylindrical portion can be more advanced towards an opposite side to the large diameter portion than the restricting surface along in an axial direction;

when the large diameter portion does not apply an impact force on the flange portion and the elastic body is in a non-deformed state, the elastic body is disposed having a gap relative to at least one of the inner peripheral surface of the housing and the outer peripheral surface of the cylindrical portion and the end portion of the cylindrical portion of the impact receiving member is disposed away from the restricting surface in the axial direction and toward the large diameter portion by a predetermined distance; and when the large diameter portion applies the impact force on the flange portion, the elastic body is compressed by the restricting surface and the flange portion in an axial direction to be deformed into a state that the elastic body is brought into contact with all of the inner peripheral surface of the housing, the restricting surface, the outer peripheral surface of the cylindrical portion and the flange portion to be filled in the gap, and the impact receiving member is restricted from the relative movement relative to the housing by the deformed elastic body when the end portion of the cylindrical portion is advanced into the relief portion and the impact receiving member keeps a non-contact state with the housing.

2. The damper device according to claim 1, wherein,
when the impact force is applied on the flange portion from the large diameter portion and under the state before the end portion of the cylindrical portion enters into the relief portion, the elastic body is deformed into a state that the elastic body is brought into contact with all of the inner peripheral surface of the housing, the restricting surface, the outer peripheral surface of the cylindrical portion and the flange portion to be filled in the gap; and wherein the impact receiving member is restricted from the relative movement relative to the housing by the deformed elastic body.

3. The damper device according to claim 1, wherein,
the relief portion has an inner peripheral surface which inner diameter is larger than an outer diameter of the outer peripheral surface of the cylindrical portion and a bottom surface facing to an end surface of the cylindrical portion.

4. A steering device provided with the damper device defined in claim 1, wherein,
the steering device includes;
a rack shaft as the shaft, which is connected to steered wheels via tie rods at both ends thereof and is reciprocally movable in an axial direction to turn the steered wheels, and large diameter portions provided at both ends of the rack shaft as the large diameter portion, to which the tie rods are pivotally connected; and
a housing for accommodating the rack shaft as the housing.

* * * * *